(12) United States Patent
Spencer

(10) Patent No.: US 11,740,653 B1
(45) Date of Patent: Aug. 29, 2023

(54) MOUNTING ASSEMBLY COMPRISING A PLURALITY OF RETRACTABLE SCREENS

(71) Applicant: William B. Spencer, Morrisville, NC (US)

(72) Inventor: William B. Spencer, Morrisville, NC (US)

(*) Notice: Subject to any disclaimer, the term of this patent is extended or adjusted under 35 U.S.C. 154(b) by 0 days.

(21) Appl. No.: 18/195,097

(22) Filed: May 9, 2023

Related U.S. Application Data

(60) Provisional application No. 63/343,560, filed on May 19, 2022.

(51) Int. Cl.
*B43L 1/00* (2006.01)
*G06F 1/16* (2006.01)
*G09F 19/00* (2006.01)

(52) U.S. Cl.
CPC ............ *G06F 1/1601* (2013.01); *B43L 1/00* (2013.01); *G09F 19/00* (2013.01)

(58) Field of Classification Search
CPC .. B43L 1/00; B43L 1/08; G09B 29/06; G09B 29/08
USPC ........... 434/408, 414; 40/514, 515, 518, 520
See application file for complete search history.

(56) References Cited

U.S. PATENT DOCUMENTS

| | | | | |
|---|---|---|---|---|
| 91,766 A * | 6/1869 | Ostrander | ................ | G09F 7/12 40/515 |
| 130,050 A * | 7/1872 | Highfield | ................ | A47B 97/02 40/515 |
| 221,550 A * | 11/1879 | Grant | ................ | A47B 97/02 40/515 |
| 461,869 A * | 10/1891 | Garner | ................ | G09F 7/12 40/515 |
| 523,814 A * | 7/1894 | Hussey | ................ | G09F 7/12 40/515 |
| 798,873 A * | 9/1905 | Case | ................ | G09F 7/12 40/515 |
| 1,233,317 A * | 7/1917 | Costello | ................ | A47B 97/02 40/515 |
| 1,614,957 A * | 1/1927 | Holloway | ................ | B60R 7/081 40/515 |
| 3,090,426 A * | 5/1963 | Carlo | ................ | E06B 9/08 160/180 |
| 3,587,183 A * | 6/1971 | Cole | ................ | A47B 97/04 40/515 |
| 4,089,361 A * | 5/1978 | Zeppmeisel | ................ | G03B 15/06 160/241 |
| 4,794,715 A * | 1/1989 | Cherwin | ................ | B60J 1/2038 40/643 |
| 5,207,581 A * | 5/1993 | Boyd | ................ | G09F 11/18 40/594 |

(Continued)

*Primary Examiner* — Kurt Fernstrom
(74) *Attorney, Agent, or Firm* — Ashley D. Johnson; Dogwood Patent and Trademark Law

(57) ABSTRACT

The invention is directed to a system of presenting and displaying information in a home office or executive environment. The system includes an outer casing that houses a plurality of pull-down screens. In use, the screens can be extended in a downward direction from the open lower face of the casing. Advantageously, the assembly provides a storage configuration where a plurality of pull-down screens are hidden from view within the interior of the casing. The assembly also includes a use configuration where one or more screens extend from the bottom face of the casing, allowing information/ideas to be exchanged and conveyed.

20 Claims, 12 Drawing Sheets

(56) References Cited

U.S. PATENT DOCUMENTS

| | | | | |
|---|---|---|---|---|
| 5,392,549 A | * | 2/1995 | Castro | G09F 11/21 |
| | | | | 160/241 |
| 7,706,066 B2 | * | 4/2010 | Adams | G03B 21/56 |
| | | | | 359/461 |
| 7,901,213 B1 | * | 3/2011 | Beno | B43L 1/00 |
| | | | | 434/408 |
| 8,622,750 B2 | * | 1/2014 | Balint | G09F 15/00 |
| | | | | 434/408 |
| 10,684,542 B2 | * | 6/2020 | Enochs | F16M 13/027 |

\* cited by examiner

MOUNTING ASSEMBLY COMPRISING A PLURALITY OF RETRACTABLE SCREENS

CROSS-REFERENCE TO RELATED APPLICATIONS

This application claims priority to U.S. Provisional Patent Application No. 63/343,560, filed May 19, 2022, the entire content of which is hereby incorporated by reference herein.

TECHNICAL FIELD

The presently disclosed subject matter is generally directed to a mounting assembly that includes a plurality of pull-down screens that can each be easily and efficiently retracted and extended. The screens are entirely hidden from a front view in the retracted configuration.

BACKGROUND

Dry erase boards are widely used for business, educational, and entertainment purposes, such as to provide information to an audience during a meeting or presentation. In their most basic form, the dry erase boards are formed from a simple flat panel mounted from a ceiling or wall. The panels can be written on and erased, allowing a user to relay large amounts of information to an audience. However, prior art dry erase boards suffer from several drawbacks. Particularly, the boards are typically permanently mounted to a wall or other support structure. As such, the boards are always visible, even when not in use. The dry erase boards are unsightly and distract from the aesthetics of an office or other facility. Exposed erase boards are also susceptible to damage from curious children, pets, and the like. In addition, prior art dry erase boards are limited to a single surface upon which to write or view materials. If additional or varying information is desired to be displayed, the board must be erased first. It would therefore be desirable to provide an assembly that overcomes the shortcomings of the prior art. Specifically, it would be desirable to provide a pull-down assembly that integrates a plurality of flexible and rollable dry erase screens into a single structure that is hidden from view when in a storage configuration.

SUMMARY

In some embodiments, the presently disclosed subject matter is directed to an assembly comprising an outer casing defined by a top surface, a front surface, a rear surface, a pair of sidewalls, and an open bottom surface defining an interior. The assembly also includes two or more rollable dry erase boards, each defined by a bottom edge, top edge, front face, rear face, and side edges. The assembly comprises two or more roller bars configured within the interior of the outer casing. Each roller bar is defined by a first end connected to a first casing sidewall, a second end connected to a second casing sidewall, a length between the first and second ends, and at least one helically wound torsion spring operatively connected to the roller bar to drivingly rotate the roller in at least one direction of rotation. The assembly includes a retention arm rotatable between a first orientation and a second orientation adjacent to a rear surface of the casing. Each screen is wound around a corresponding roller bar in a first configuration. Each dry erase board is at least partially unwound from a corresponding roller bar in a second configuration. Each roller bar is mounted adjacent to adjacent roller bars at an angle of about 30-60 degrees relative to the horizontal. In addition, the first dry erase board rolls up and is positioned to contact the support wall and therefore cannot move. Thus, the first roll up board stops against the support wall. The adjacent roll up board must be positioned close enough to the first roller bar to contact it. As such, the roll up dry erase boards have stops built in.

In some embodiments, the two or more roller bars, two or more pull down screens, and a retention arm are housed within the interior of the casing.

In some embodiments, each rollable screen comprises one or more of printed materials, dry erase material, paper, or matrix materials.

In some embodiments, the top face of the casing comprises a lip.

In some embodiments, the rear face of the casing comprises one or more hangers that cooperate with hangers positioned on a support surface to hang the assembly.

In some embodiments, each screen includes a pull down rod positioned adjacent to the bottom edge of the screen.

In some embodiments, each pull down rod is weighted with about 0.5-5 pounds.

In some embodiments, each rollable pull down screen is constructed from fabric, plastic, paper, rubber, metal foil, or combinations thereof.

In some embodiments, the top edge of each rollable pull down screen is attached to a corresponding roller bar using adhesives, heat sealing, grommets, magnets, ties, staples, screws, hook and loop closure, tape, binding, snaps, or combinations thereof.

In some embodiments, the casing includes a switch that allows the retention arm to be adjusted between the first orientation and the second orientation.

In some embodiments, roller bar is mounted adjacent to adjacent roller bars at an angle of about 45 degrees relative to the horizontal.

In some embodiments, the presently disclosed subject matter is directed to a method of extending at least one rollable dry erase board from an assembly. The method comprises applying a downward pressure to the bottom end of at least one rollable pull down screen of the disclosed assembly. The method also includes extending the retention arm to the second orientation and pulling the rollable pull down screen to a desired length. After a desired amount of time, the method comprises retracting the board around the corresponding roller bar by releasing the helically wound tension spring and extending the retention arm to the first orientation.

In some embodiments, the method further includes extending a second pull-down rollable dry erase screen from a second roller bar.

BRIEF DESCRIPTION OF THE DRAWINGS

FIG. 1 b is a perspective view of the assembly of FIG. 1 a in a use configuration in accordance with some embodiments of the presently disclosed subject matter.

DETAILED DESCRIPTION

Figure 1A:
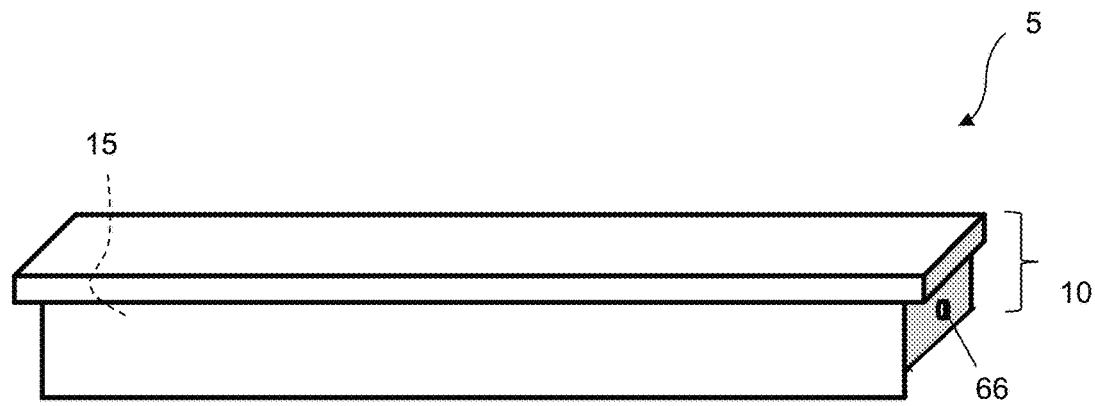
FIG. 1 a is a perspective view of a rollable screen assembly in a storage configuration in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1B:
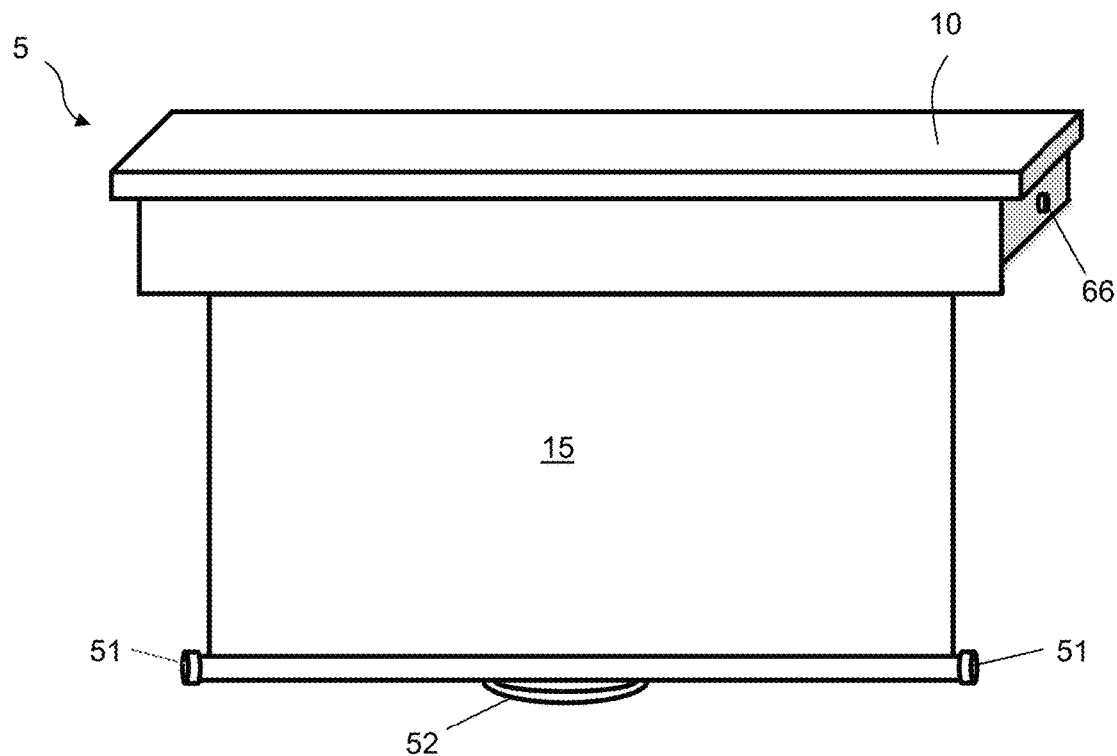

The presently disclosed subject matter is generally directed to a system of presenting and displaying information in a home office or executive environment. As shown in FIG. 1a, system 5 includes casing 10 that houses a plurality of pull-down rollable screens 15 (e.g., rollable dry erase boards). The screens are therefore held within or behind casing 10 yet can still be activated to an extended orientation, displaying information to one or more viewers. The rollable screens can include a variety of diverse display surfaces, such as maps, dry erase boards, refillable tablets, screens that communicate with a phone or other smart device, and/or a matrix that relates to a specific culture or proprietary process. In use, the screens can be extended in a downward direction from the open lower face of the casing, as illustrated in FIG. 1b. Advantageously, assembly 5 provides a storage configuration where a plurality of pull-down screens are hidden from view within the interior of casing 10. The assembly also includes a use configuration where one or more screens extend from the bottom face of the casing, allowing information/ideas to be exchanged and conveyed.

Figure 2A:
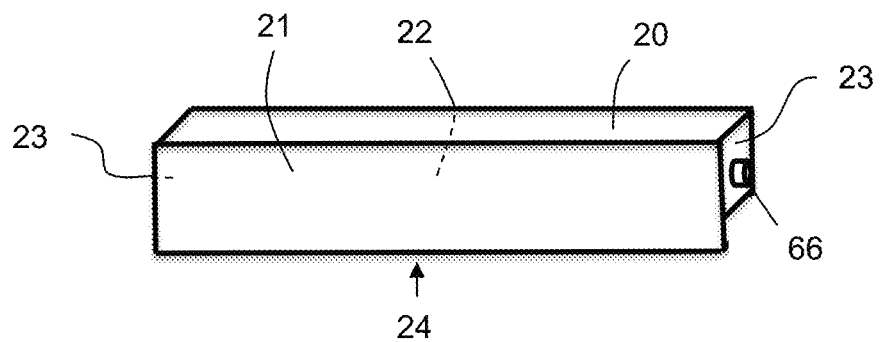
FIG. 2a is a perspective view of an assembly casing in accordance with some embodiments of the presently disclosed subject matter.

As set forth above, system casing 10 provides an attractive look to assembly 5, hiding the mechanics of the screens when not in use. The term "casing" broadly refers to any element that fits at least partially around one or more screens. FIG. 2a illustrates one embodiment of casing 10 comprising top surface 20, front face 21 that extends toward a viewer, and opposed open rear face 22 positioned adjacent to a support surface (e.g., a wall). The casing further includes a pair of side faces 23 and open bottom face 24 that allows a user to access screens 15 housed within the interior of the casing. The open bottom face also allows the screens to extend in a downward direction during use.

In some embodiments, the casing can be mounted to a support surface in a horizontal configuration as shown in FIG. 2a. However, the screen can be mounted in any desired orientation, including angled.

Figure 2B:
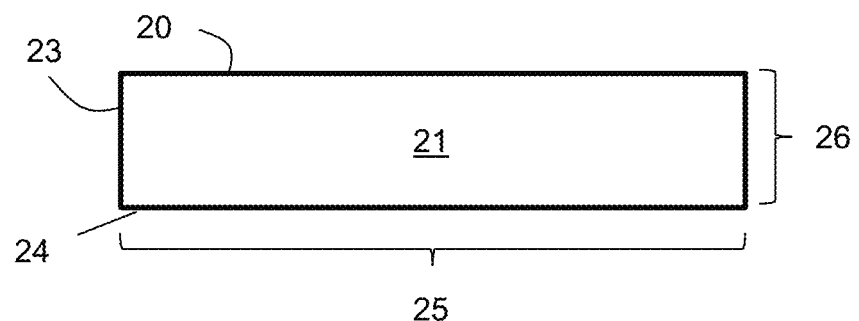
FIG. 2b is a front plan view of a casing in accordance with some embodiments of the presently disclosed subject matter.
Figure 2C:
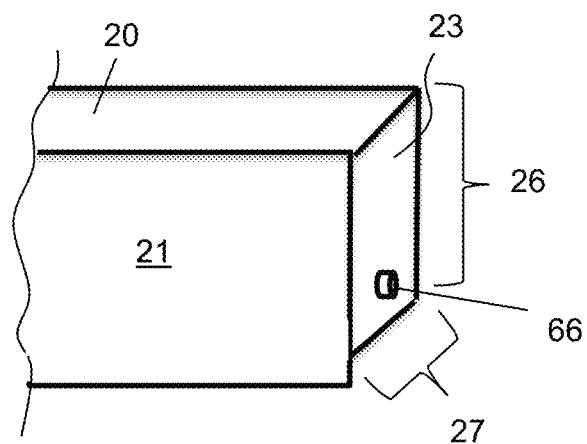
FIG. 2c is a fragmentary perspective view of an assembly casing in accordance with some embodiments of the presently disclosed subject matter.

Casing 10 can have any desired dimensions. For example, the casing can include length 25 of about 10-60 inches (e.g., at least/no more than about 10, 15, 20, 25, 30, 35, 40, 45, 50, 55, or 60 inches), as shown in FIG. 2b. The term "length" refers to the longest horizontal distance of the casing. Similarly, the casing can have width 26 of about 2-20 inches (e.g., at least/no more than about 2, 4, 6, 8, 10, 12, 14, 16, 18, or 20 inches). The term "width" refers to the longest vertical distance of the casing. As shown in the FIG. 2c, the casing also includes thickness 27 of about 2-10 inches (e.g., at least/no more than about 2, 3, 4, 5, 6, 7, 8, 9, or 10 inches). The term "thickness" refers to the longest straight line distance perpendicular to both the length and width. It should be appreciated that the dimensions of casing 15 are not limited and can be configured with a length, width, and/or thickness outside the ranges given above.

In some embodiments, each end of the casing can be shorter than the front face (e.g., about 0.75 inches shorter) so that the compression bar is hidden in the cornice when retracted.

Although depicted as rectangular in shape in the figures, casing 10 can have any desired shape or cross-sectional shape, such as square, triangular, round, oval, hexagonal, pentagonal, and the like. In some embodiments, the casing can have a formed shape, such as a cloud, heart, football, flower, and the like.

Figure 3A:
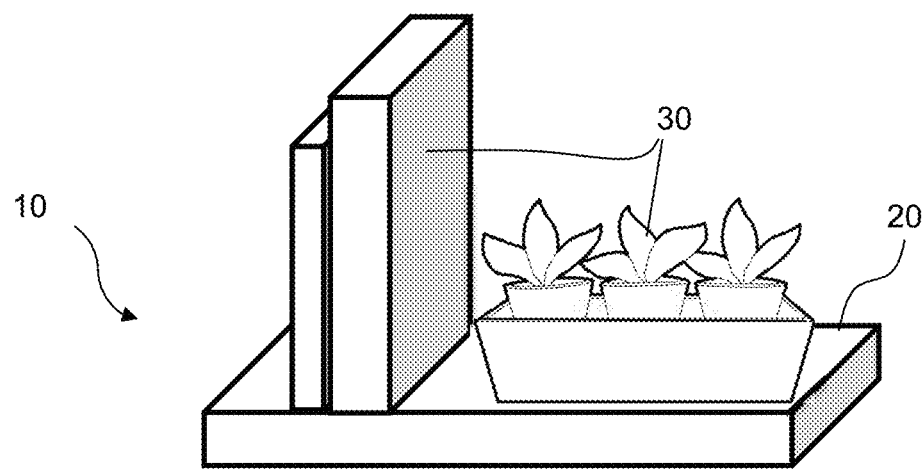
FIG. 3a is a perspective view of a casing supporting a series of items in accordance with some embodiments of the presently disclosed subject matter.
Figure 3B:
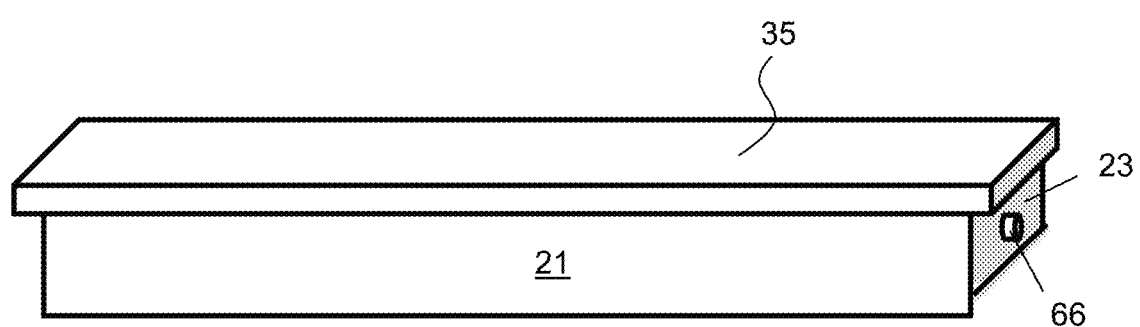
FIG. 3b is a perspective view of a casing supporting an upper lip in accordance with some embodiments of the presently disclosed subject matter.

In some embodiments, top surface 20 of the casing can be used to store one or more items 30 (e.g., books, bookends, vases, plants, decorative items), thereby creating the impression of a shelf or bookcase, as shown in FIG. 3a. The items can be positioned directly on top surface 20. Alternatively, the top surface can include lip 35 that creates a wider and more stable surface upon which items can rest, as illustrated in FIG. 3b. The term "lip" broadly refers to any support element, such as a plank, board, shelf, ledge, and the like.

Figure 3C:
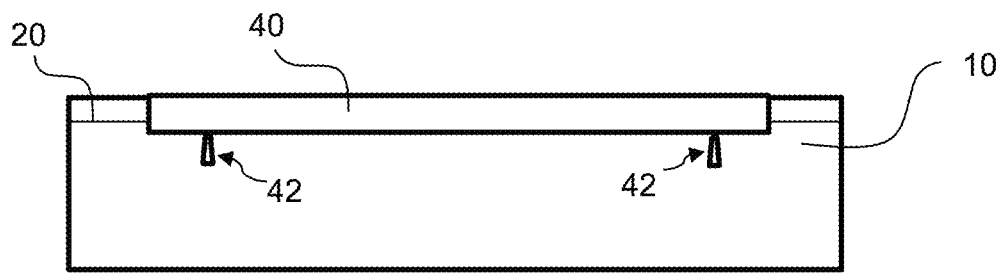
FIG. 3c is a rear plan view of a casing comprising a series of hangers in accordance with some embodiments of the presently disclosed subject matter.

Rear face 22 of the casing is open and can therefore be hung on any of a wide variety of hangers 40 that enable the assembly to be permanently or releasably attached to a support surface, such as a wall, cabinet, or the like, as shown in FIG. 3c. Suitable hangers 40 can include (but are not limited to) one or more fasteners, VELCRO®, ties, magnets, hooks, screws, bolts, adhesive, or combinations thereof. Alternatively, the hanger can be configured as a block of material, such as wood that supports the weight of the assembly. The hangers cooperate with the top face of the casing to support the weight of the assembly.

In some embodiments, the hanger can be configured as wall cleat 43 that is attached to a support surface (e.g., wall). The rear face of the casing is then set in the casing cleat 40 such that it can be adjusted left or right as desired by the user before being secured in position (e.g., with screws).

Casing 10 can be constructed from any desired material, such as (but not limited to) wood, metal, plastic, ceramics, glass, resin, rubber, stone, concrete, or combinations thereof.

Figure 3D:
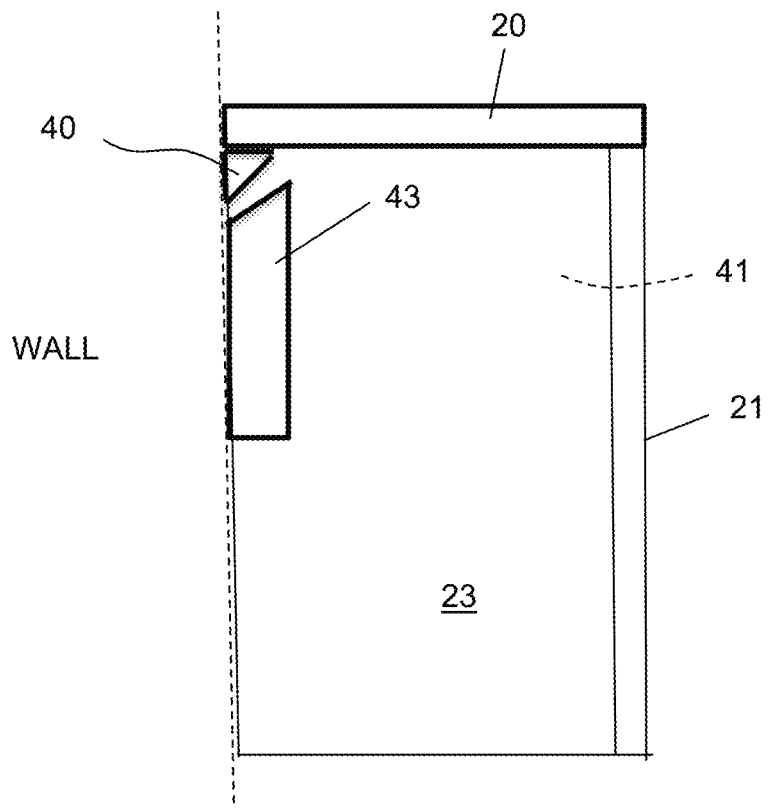
FIG. 3d is a perspective view of an assembly casing with an open bottom end creating an interior with a wall cleat and a casing cleat in accordance with some embodiments of the presently disclosed subject matter.
Figure 4A:
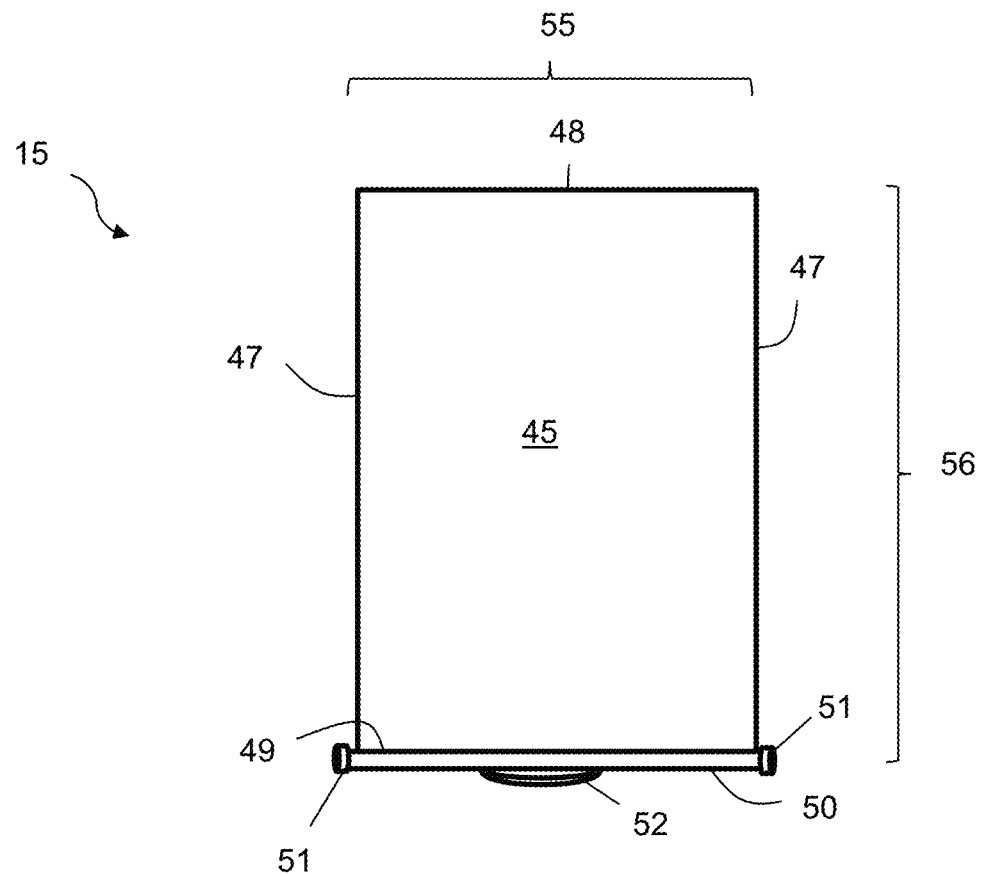
FIG. 4a is a front plan view of an assembly rollable pull down screen in accordance with some embodiments of the presently disclosed subject matter.
Figure 4B:
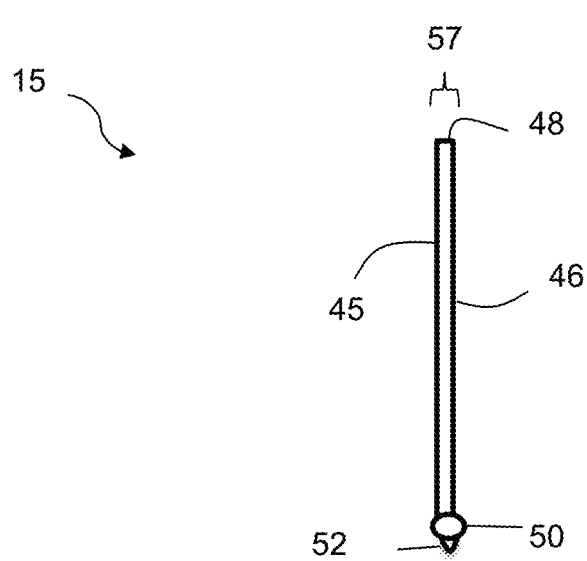
FIG. 4b is a side plan view of an assembly rollable pull down screen in accordance with some embodiments of the presently disclosed subject matter.

As disclosed above, the casing also includes an open bottom face that creates interior 41, as shown in FIG. 3d. The interior houses two or more pull-down screens 15 that can be independently extended or retracted. The term "screen" refers to any visual element or combinations of visual elements for displaying information. One embodiment of screen 15 is shown in FIGS. 4a and 4b, illustrating screen front surface 45 and opposed rear surface 46. Each screen further includes side edges 47, top edge 48, and bottom edge 49.

In some embodiments, the screen can include rod 50 positioned adjacent to bottom edge 49, facilitating extension of the screen. Specifically, a user can easily grasp 20 pulldown rod 50 to maneuver the screen between the extended and retracted positions.

The rod can be weighted (e.g., 0.5-5 pounds), which maintains the screen in a level orientation when retracted. Rod 50 further functions to balance the screens and casing. The rod can have any desired cross-sectional shape, such as round or oval. At each end, the rod can include endcap 51 that protects the screen (e.g., dry erase screen information) from being smudged when it is in a rolled configuration. In some embodiments, the rod can include handle 52 that allows the screen rod to be easily grasped and maneuvered.

Figure 4C:
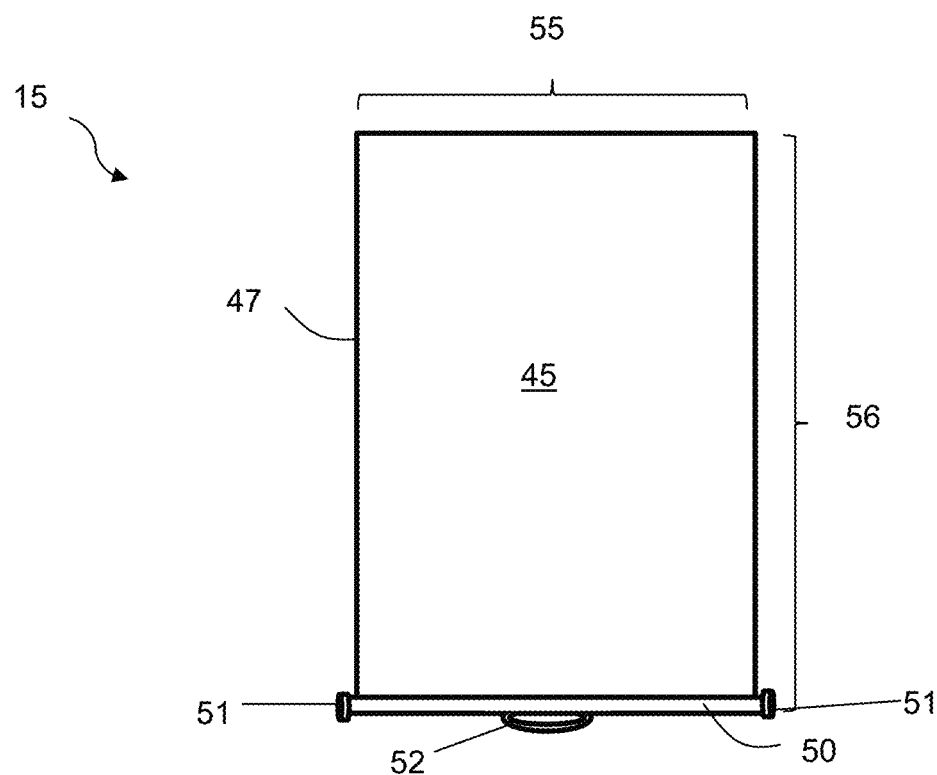
FIG. 4c is a front plan view of an assembly rollable pull down screen illustrating the board length and width in accordance with some embodiments of the presently disclosed subject matter.

Screen 15 can have length 55 of about 10-50 inches (e.g., at least/no more than about 10, 15, 20, 25, 30, 35, 40, 45, or 50), as shown in FIG. 4c. The screen can further include width 56 of about 10-100 inches (e.g., at least/no more than about 10, 15, 20, 25, 30 30, 35, 40, 45, 50, 55, 60, 65, 70, 75, 80, 85, 90, 95, or 100 inches). Screen thickness 57 can be about 0.001-1 inches (e.g., at least/no more than about 0.001, 0.005, 0.01, 0.05, 0.1, 0.2, 0.3, 0.4, 0.5, 0.6, 0.7, 0.8, 0.9, or 1 inches). However, the length, width, and thickness of the screen are not limited and can be configured outside the ranges given above.

Screen 15 can be constructed from any of a wide variety of flexible materials, such as (but not limited to) fabric, plastic, paper, rubber, metal foil, and the like. The term "flexible" refers to any material that is capable of being rolled around a core. For example, prior art screen materials are designed to be used and stored in a flat configuration. When prior art dry erase materials are rolled, tunneling between the dry erase surface and the white vinyl base occurs. Use of a tighter bond material between the clear dry erase surface and the white backing vinyl solves the problem.

Figure 5A:
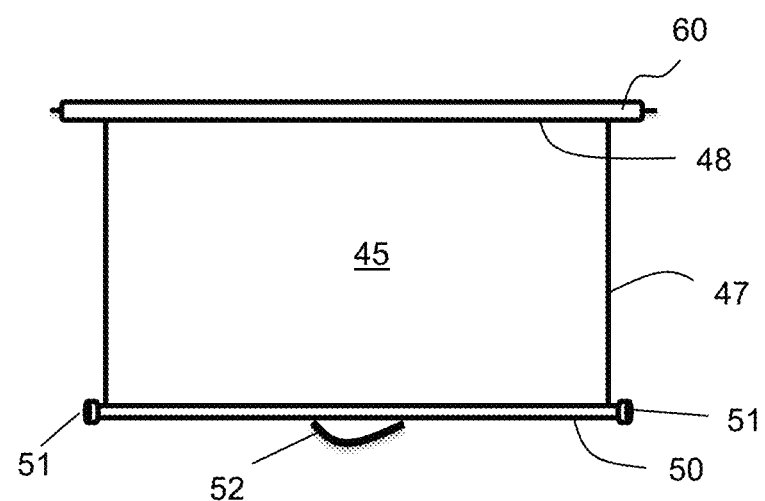
FIG. 5a is a front plan view of a rollable pull down screen attached to a roller bar in an extended configuration in accordance with some embodiments of the presently disclosed subject matter.
Figure 5B:
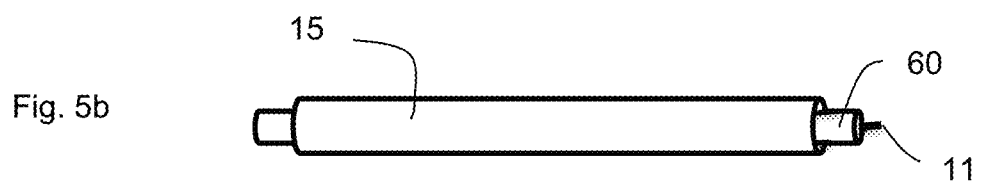
FIG. 5b is a perspective view of a rollable pull down screen attached to a roller bar in a storage configuration in accordance with some embodiments of the presently disclosed subject matter.

Top edge 48 of the screen is attached to roller bar 60, as shown in FIGS. 5*a*. The term "roller bar" refers to any support element upon which a screen can be wound and unwound. Any conventional element can be used to secure the top screen edge to the roller bar. For example, the use of adhesives, heat sealing, grommets, magnets, ties, staples, screws, VELCRO®, tape, binding, snaps, and the like can be used. Connection of the screen top edge allows the full screen to be secured around roller bar 60 with end pin 11, as shown in FIG. 5*b*. By rolling and unrolling from the roller bar, screen 15 can be raised and lowered as desired by the user.

Figure 5C:
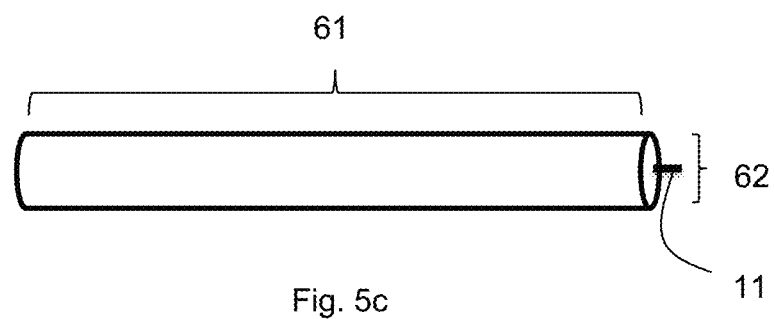
FIG. 5c is a perspective view of a roller bar in accordance with some embodiments of the presently disclosed subject matter.
Figure 5D:
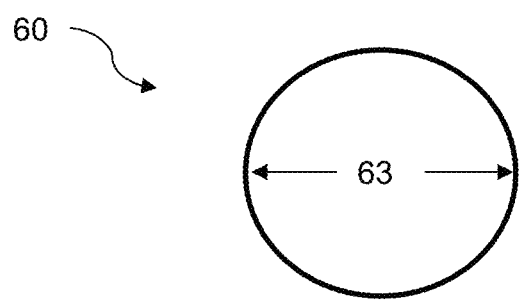
FIG. 5d is a cross-sectional view of a helically wound roller bar in accordance with some embodiments of the presently disclosed subject matter.

One embodiment of roller bar 60 is shown in FIG. 5*c*. The roller bar can be a helically wound spring roller, configured with an interior spring for biasing the roller bar. The spring can be a helically wound torsion spring operatively connected to the roller bar to drivingly rotate the roller in at least one direction of rotation. Roller 60 rotates about its longitudinal axis in response to a downward or upward release. In this manner, rotation of roller 60 causes flexible screen 15 to be raised and lowered. Thus, screen 15 is movable between a rolled condition in which the screen is configured about roller 60 and an unrolled condition in which the screen is partially or fully unwound from the bar. The roller bar also can include pin 61 that is sized and shaped to fit into a retention element to retain the roller bar in an unroller configuration.

In some embodiments, roller bar 60 can have length 61 of about 10-60 inches (e.g., at least/no more than about 10, 15, 20, 25, 30, 35, 40, 45, 50, 55, or 60 inches). The roller bar can further include width 62 and/or thickness 63 of about 0.5-5 inches (e.g., at least/no more than about 0.5, 1, 1.5, 2, 2.5, 3, 3.5, 4, 4.5, or 5 inches).

The roller bar can have any suitable cross-sectional shape, such as round or oval cylindrical rod. However, the presently disclosed subject matter is not limited and roller bar 60 can have any cross-sectional shape.

Figure 6A:
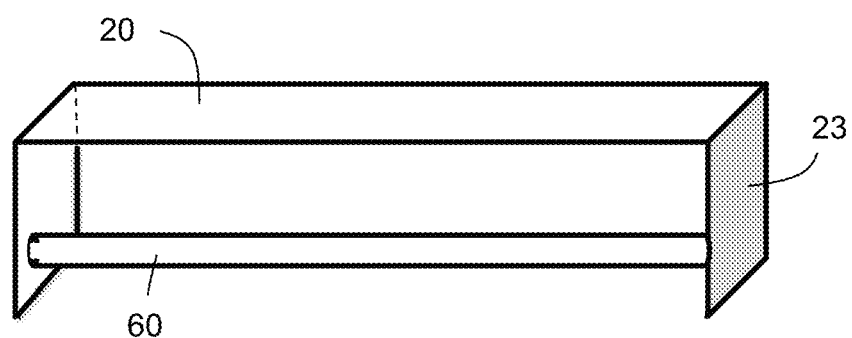
FIG. 6a is a perspective view of an assembly casing comprising a roller bar in accordance with some embodiments of the presently disclosed subject matter.
Figure 6B:
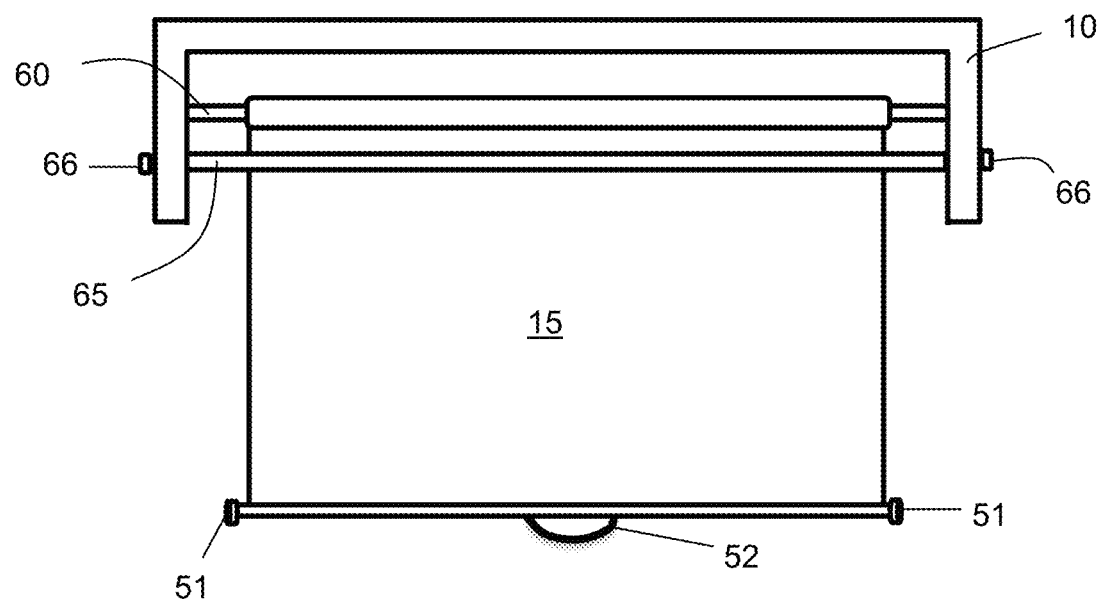
FIG. 6b is a rear plan view of an assembly casing comprising a roller bar and retention arm in accordance with some embodiments of the presently disclosed subject matter.

Each roller bar 60 is mounted within the interior of casing 10 (e.g., within the cover interior). As shown in FIG. 6*a*, each end of the roller bar can be mounted on an interior surface of the casing side walls. The retention arm can be permanently or releasably attached to the casing using any conventional mechanism. For example, in some embodiments, adhesive, magnets, ties, fasteners, welding, and/or mechanical elements (e.g., screws, bolts) can be used.

Roller 60 can be constructed from any material that is sufficiently rigid to support the weight of screen 15, such as (but not limited to) aluminum, steel, stainless steel, copper, wood, plastic, and the like.

In some embodiments, the assembly can include retention arm 65 that functions to keep the screen from extending in a forward direction when in use, as shown in FIGS. 7*a*-7*e*. Thus, as the screen unwinds from support bar 60, it remains in a position adjacent to a support surface, such as a wall or cabinet. In this way, the front surface of the screen is visible to viewers. The arm is hidden from view by casing 10 and pulls out easily to push the screen against a support surface (e.g., wall) during use to allow writing and/or drawing.

In use, arm 65 can be positioned at an angle relative to a roller to ensure that the screen lies flush against the rear support wall. For example, in a first position arm 65 can rest to contact the rear support wall. In this way, the user has a support surface upon which to write (e.g., the roll up screen provides no support). When in the first position (pushed adjacent to the wall), the arm is totally hidden from view behind the casing. The arm can be moved to a forward position to release the screen (e.g., when the screen is no longer in use). Arm 65 can be manually adjusted by applying light pressure in some embodiments. In other embodiments, the position of arm 65 can be adjusted using switch. The term "switch" broadly refers to any element that can affect movement of the retention arm.

The disclosed system can include a plurality of screens, such as about 1-5 or more. In this way, a variety of screens are available for use (e.g., map, paper, dry erase). Each screen can be stored or retracted independently from other screens. For example, in some embodiments, each screen includes an associated spring roller that allows for quick and easy retraction of the screen between the storage and use configurations.

Figure 7A:
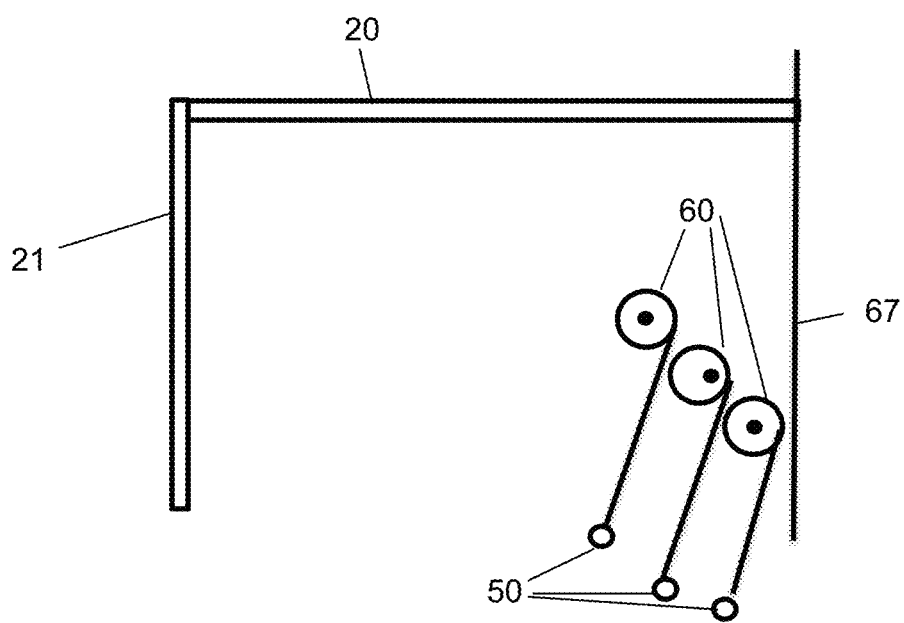
FIG. 7a is a side fragmentary view of a casing comprising three internal bars with screens in accordance with some embodiments of the presently disclosed subject matter.
Figure 7B:
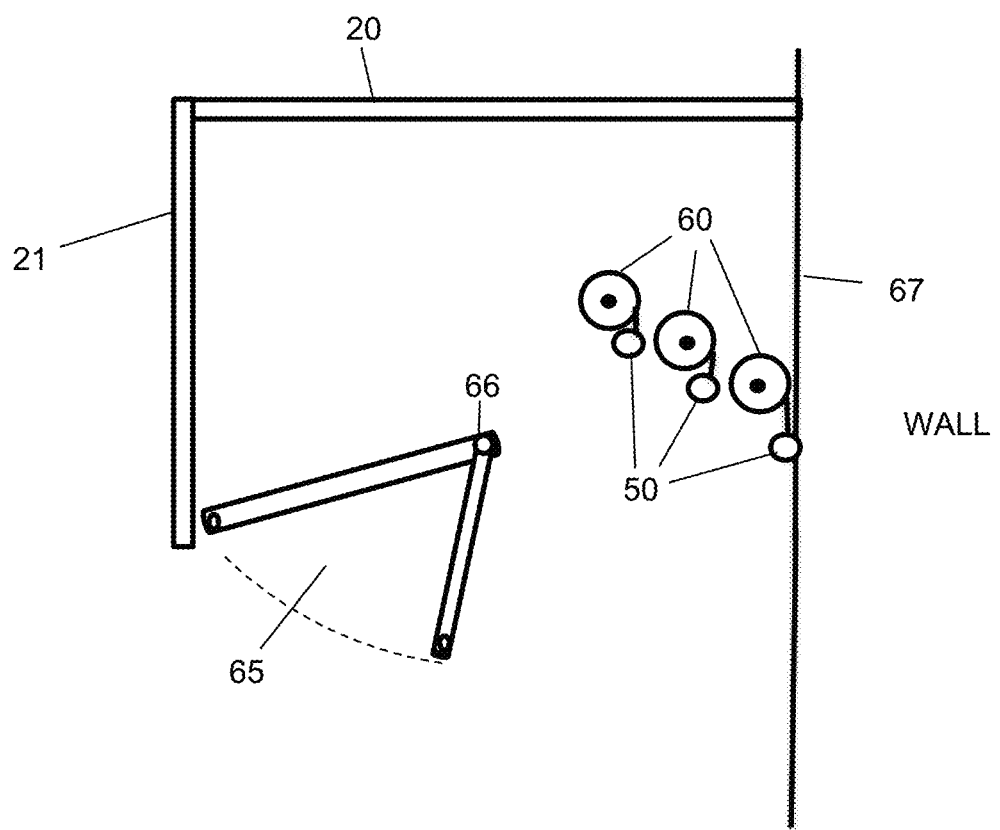
FIG. 7b is a side fragmentary view of the inside of the housing with screens in a storage position with the retention arm in an open configuration in accordance with some embodiments of the presently disclosed subject matter.
Figure 7C:
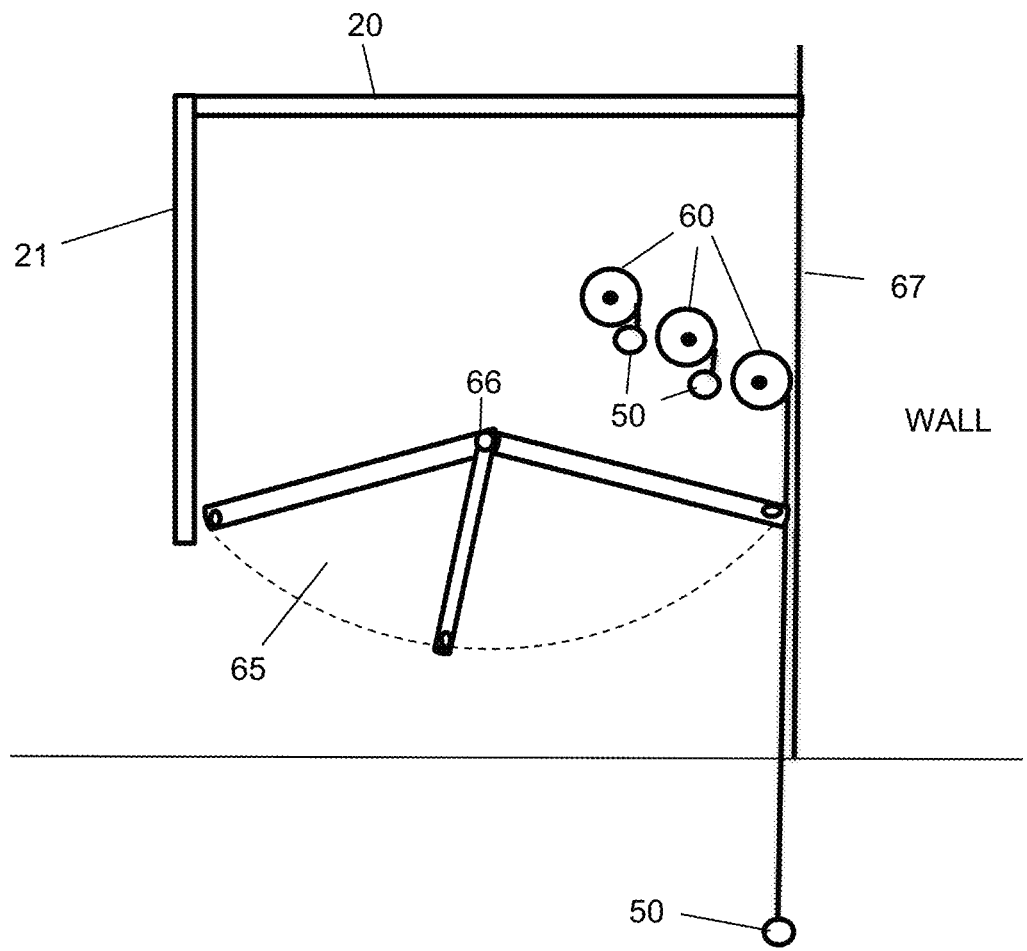
FIG. 7c is a side fragmentary view of the inside of the housing with one screen pulled down and the retention arm in use to hold the screen against the wall accordance with some embodiments of the presently disclosed subject matter.
Figure 7D:
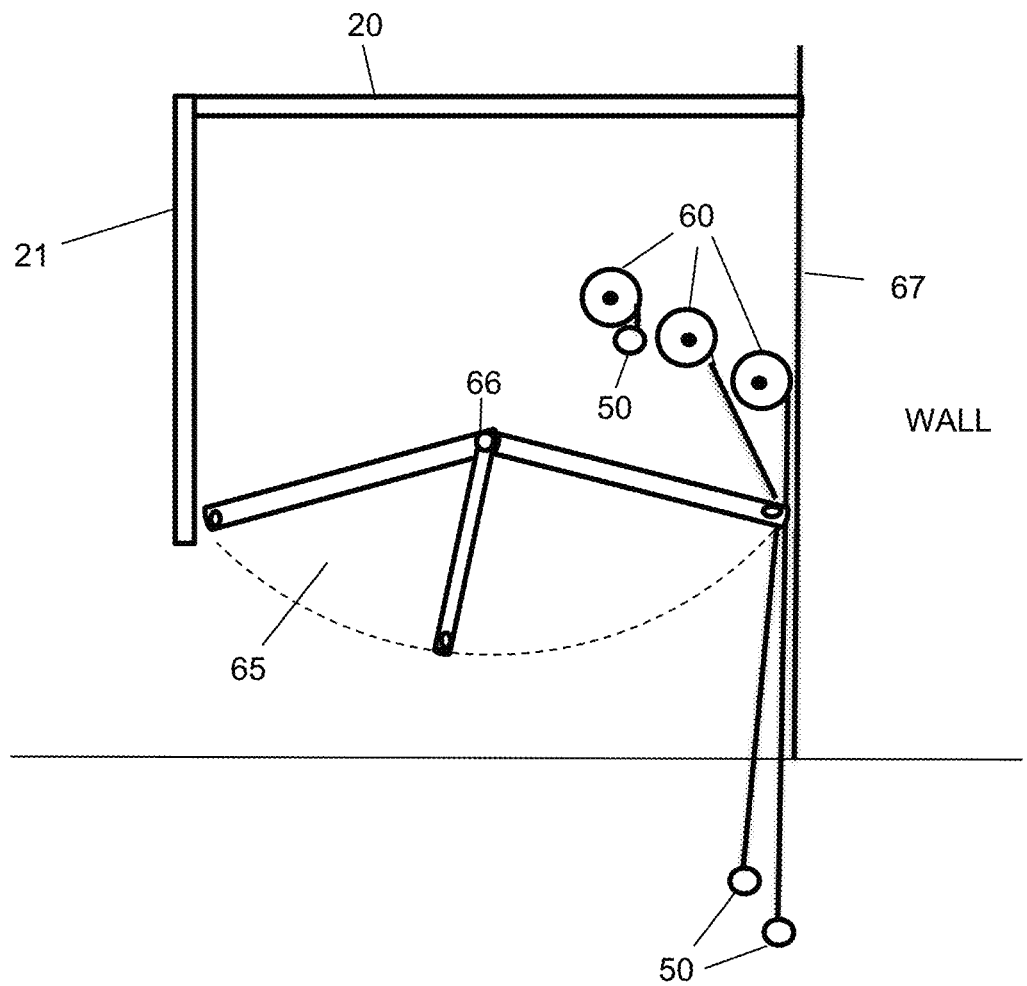
FIG. 7d is a side fragmentary view of the inside of the housing with two screens pulled down to the desired length and the retention arm holding both screens against the wall in accordance with some embodiments of the presently disclosed subject matter.
Figure 7E:
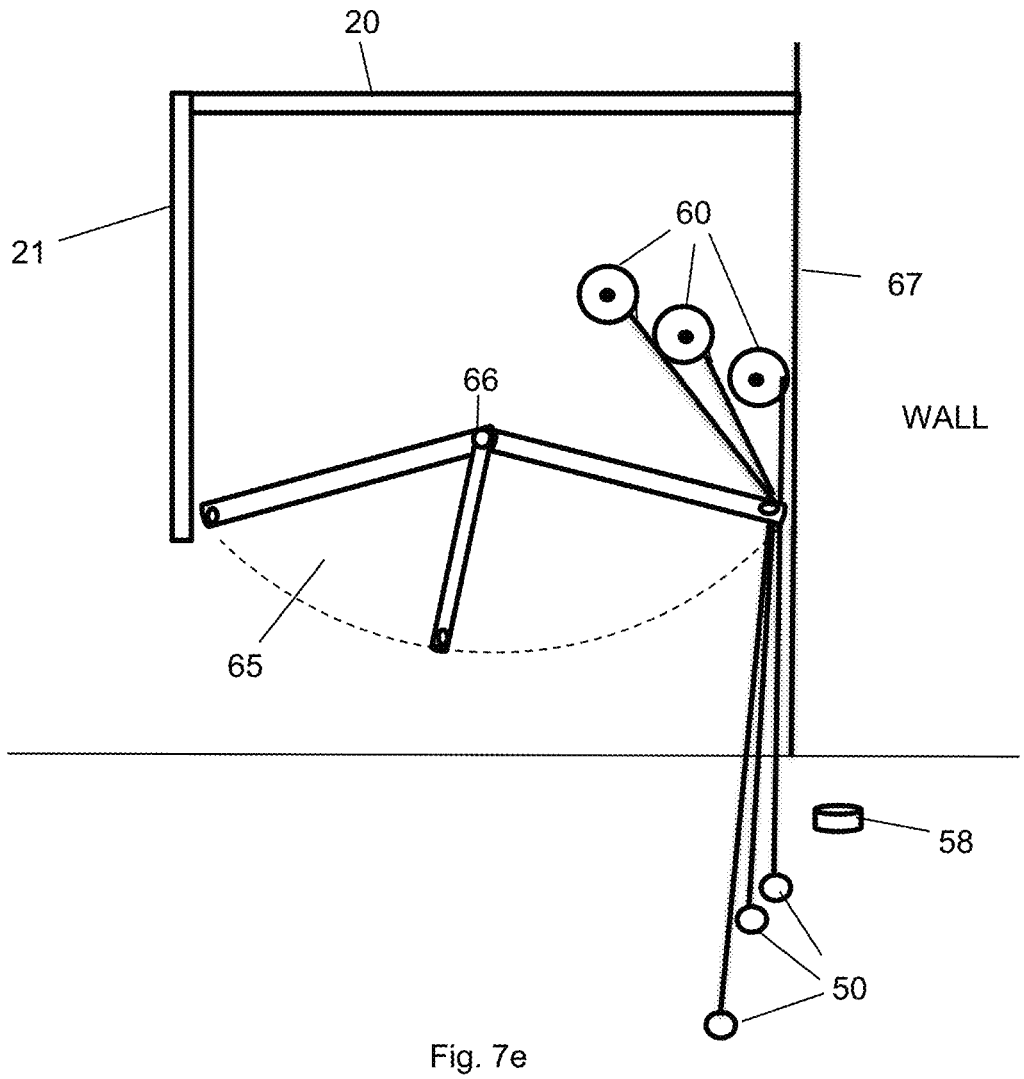
FIG. 7e is a side fragmentary view of the inside of the housing with three screens pulled down to the desired length and the retention arm holding the screens against the wall in accordance with some embodiments of the presently disclosed subject matter.

Subsequent spring roller bars are mounted on the interior of the casing sidewalls at a rising angle relative to the horizontal, as shown in FIGS. 7*a* and 7*b*. In some embodiments, the angle between the roller bars can be about 45 degrees. However, the angle can vary from about 30-60 degrees in some embodiments (at least/no more than about 30, 35, 40, 45, 50, 55, 60 degrees). The angle that the arm hits the previous spring roller bar will not dislodge the spring roller since it is designed to be lifted and pulled toward the user to be removed.

In use, two or more screens 15 are housed within the interior of casing 10 in the storage orientation. Specifically, the entire screen and associated mechanics are confined within casing interior 41. Arm 65 is in the rest position, adjacent to the front wall of the casing, and the screen is wound around the roller bar. In the storage configuration, the roller bars, screens, and arm 65 are not visible due to casing 10. The top face of the casing can be used to store or display one or more items, such as books, art, sports items, plants, and the like.

In the use configuration, a first screen 15 is grasped by rod 50 and a downward force is applied. In response to the downward force, the screen begins to unwind from roller bar 60. The user can activate arm 65 to maintain the length of the screen flush against the rear support surface to stabilize the screen. The user can continue to apply the downward pressure to the rod until a desired portion of the screen is unwound. The screen can then be used as desired. The first screen contacts and rests against the support wall in the use configuration. In this way, the user can write on the screen and the wall provides a support.

If an additional screen is needed, arm 65 is adjusted to the forward position, thereby releasing the first screen to be retracted onto the roller bar. Once the first screen is retracted, a second screen can be maneuvered to the use position by applying a downward pressure and rotating the arm to the use position, flush against the support surface. The clearance of the roller bars must be very close to each other, acting as stops for the roller bar above it.

In some embodiments, the first screen can remain in the use orientation when the second screen is extended. It should be appreciated that the second screen is extended in front of the first screen, thereby blocking all or a portion of the first screen due to overlaying.

The presently disclosed assembly includes many advantages over the prior art. For example, the disclosed board facilitates free flowing thought and feedback, providing organized system and method of presenting and accepting information.

The disclosed board also allows for organized flow of information, especially compared to handwritten sketches and messy scratch paper commonly used to present ideas.

Assembly 5 also provides an attractive appearance for screens 15, hiding unsightly mechanics using an outer casing.

The disclosed assembly is easy to use, such that even children or the elderly can effectively extend and retract the screens.

The foregoing descriptions have been presented for purposes of illustration and description and are not intended to be exhaustive or to limit the presently disclosed subject matter. Many modifications and variations are possible in light of the present disclosure.

What is claimed is:

1. An assembly comprising:
   an outer casing comprising a top surface, a front surface, a rear surface, a pair of sidewalls, and an open bottom surface defining an interior;
   two or more screens, each defined by a bottom edge, top edge, front face, rear face, and side edges;
   two or more helically wound roller bars configured within the interior of the outer casing, each roller bar defined by:
   a first end connected to a first casing sidewall;
   a second end connected to a second casing sidewall;
   a length between the first and second ends;
   at least one helically wound torsion spring operatively connected to the roller bar to drivingly rotate the roller in at least one direction of rotation;
   a retention arm rotatable between a first storage orientation and a second use orientation adjacent to a rear surface of the casing;
   wherein each screen is wound around a corresponding roller bar in a first configuration;
   wherein each screen is at least partially unwound from a corresponding roller bar in a second configuration; and
   wherein each roller bar is mounted adjacent to adjacent roller bars at an angle of about 30-60 degrees relative to the horizontal.

2. The assembly of claim 1, wherein the two or more roller bars, two or more screens, and retention arm are housed within the interior of the casing.

3. The assembly of claim 1, wherein each screen comprises one or more of printed materials, dry erase material, paper, or matrix materials.

4. The assembly of claim 1, wherein the top face of the casing comprises a lip.

5. The assembly of claim 1, wherein the rear face of the casing comprises one or more hangers that cooperate with hangers positioned on a support surface to hang the assembly.

6. The assembly of claim 1, wherein each screen includes a pull down rod positioned adjacent to the bottom edge of the screen.

7. The assembly of claim 6, wherein each pull down rod is weighted with about 0.5-5 pounds.

8. The assembly of claim 1, wherein each screen is constructed from fabric, plastic, paper, rubber, metal foil, or combinations thereof.

9. The assembly of claim 1, wherein the top edge of each screen is attached to a corresponding roller bar using adhesives, heat sealing, grommets, magnets, ties, staples, screws, hook and loop closure, tape, binding, snaps, or combinations thereof.

10. The assembly of claim 1, wherein the casing includes a switch that allows the retention arm to be adjusted between the first orientation and the second orientation.

11. The assembly of claim 1, wherein each roller bar is mounted adjacent to adjacent roller bars at an angle of about 45 degrees relative to the horizontal, thereby creating built in stops when retracting the helically wound roller bars.

12. A method of extending at least one pull-down screen from an assembly, the method comprising:
   applying a downward pressure to the bottom end of at least one pull-down screen of an assembly, the assembly defined by:
   an outer casing comprising a top surface, a front surface, a rear surface, a pair of sidewalls, and an open bottom surface defining an interior;
   two or more screens, each defined by a bottom edge, top edge, front face, rear face, and side edges;
   two or more roller bars configured within the interior of the outer casing, each roller bar defined by:
   a first end connected to a first casing sidewall;
   a second end connected to a second casing sidewall;
   a length between the first and second ends;
   at least one helically wound torsion spring operatively connected to the roller bar to drivingly rotate the roller in at least one direction of rotation;
   a retention arm rotatable between a first orientation and a second orientation adjacent to a rear surface of the casing;
   wherein each screen is wound around a corresponding roller bar in a first configuration;
   wherein each screen is at least partially unwound from a corresponding roller bar in a second configuration; and
   wherein each roller bar is mounted adjacent to adjacent roller bars at an angle of about 30-60 degrees relative to the horizontal;
   extending the retention arm to the second orientation;
   pulling the screen to a desired width;
   after a desired amount of time, retracting the screen around the corresponding roller bar by applying an upward pressure; and
   extending the retention arm to the first orientation.

13. The method of claim 12, further comprising extending a second pull-down screen from a second roller bar.

14. The method of claim 12, wherein the two or more roller bars, two or more screens, and retention arm are housed within the interior of the casing.

15. The method of claim 12, wherein the top face of the casing comprises a lip.

16. The method of claim 12, wherein the rear face of the casing comprises one or more hangers that cooperate with hangers positioned on a support surface to hang the assembly.

17. The method of claim 12, wherein each screen includes a support rod positioned adjacent to the bottom edge of the screen.

18. The method of claim 12, wherein each pull down rod is weighted with about 0.5-5 pounds.

19. The method of claim 12, wherein the casing includes a switch that allows the support arm to be adjusted between the first orientation and the second orientation.

20. The method of claim 12, wherein each roller bar is mounted adjacent to adjacent roller bars at an angle of about 45 degrees relative to the horizontal.

* * * * *